US009250939B2

(12) United States Patent
Odaira

(10) Patent No.: US 9,250,939 B2
(45) Date of Patent: Feb. 2, 2016

(54) INFORMATION PROCESSING DEVICE, PROFILE TARGET DETERMINING PROGRAM, AND METHOD

(71) Applicant: International Business Machines Corporation, Armonk, NY (US)

(72) Inventor: Rei Odaira, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 527 days.

(21) Appl. No.: 13/672,789

(22) Filed: Nov. 9, 2012

(65) Prior Publication Data

US 2013/0125103 A1    May 16, 2013

(30) Foreign Application Priority Data

Nov. 11, 2011    (JP) .................................. 2011-247635

(51) Int. Cl.
*G06F 9/45*    (2006.01)
*G06F 9/455*    (2006.01)

(52) U.S. Cl.
CPC ............ *G06F 9/4552* (2013.01); *G06F 8/4441* (2013.01)

(58) Field of Classification Search
CPC ...... G06F 11/34; G06F 9/4552; G06F 8/4441
USPC .................................. 717/130–133, 154–158
See application file for complete search history.

(56) References Cited

U.S. PATENT DOCUMENTS

| 6,513,155 B1* | 1/2003 | Alexander et al. ............ 717/124 |
| 7,100,155 B1* | 8/2006 | Wu .............................. 717/158 |
| 7,779,238 B2* | 8/2010 | Kosche et al. ................ 712/227 |
| 8,176,475 B2* | 5/2012 | Kosche et al. ................ 717/127 |
| 2002/0019716 A1 | 2/2002 | Agesen et al. |
| 2007/0162896 A1 | 7/2007 | Geva et al. |

FOREIGN PATENT DOCUMENTS

| JP | 11-039167 A | 2/1999 |
| JP | H11316711 A | 11/1999 |
| JP | 2002-304302 A | 10/2002 |

(Continued)

OTHER PUBLICATIONS

Chen et al., "Data Dependence Profiling for Speculative Optimizations", 2004, LNCS 2985—Compiler Construction—Springer, pp. 57-72.*

(Continued)

*Primary Examiner* — Ted T Vo
(74) *Attorney, Agent, or Firm* — Jeff Tang

(57) ABSTRACT

The information processing system of the present invention includes a profile information collection unit for storing access-related profile information in response to detecting access to an object set as a profile target on the basis of the sampling frequency for each class or object allocation site during the execution of a program, and a sampling frequency updating unit for calculating the allocation percentage of an object having properties used in the optimization of the program at each class or object allocation site on the basis of profile information, and for reducing the sampling frequency regarding a class or object allocation site in which the calculated percentage is below a predetermined threshold value.

13 Claims, 14 Drawing Sheets

(56) References Cited

FOREIGN PATENT DOCUMENTS

| | | |
|---|---|---|
| JP | 2004-102597 A | 4/2004 |
| JP | 2005-071135 A | 3/2005 |

OTHER PUBLICATIONS

Buytaert et al., "Using HPM-Sampling to Drive Dynamic Compilation", 2007, ACM, 15 pages.*

* cited by examiner

INFORMATION PROCESSING DEVICE, PROFILE TARGET DETERMINING PROGRAM, AND METHOD

CROSS-REFERENCE TO RELATED APPLICATION

This application claims priority under 35 U.S.C. §119 from Japanese Patent Application No. 2011247635 filed Nov. 11, 2011, the entire contents of which are incorporated herein by reference.

BACKGROUND OF THE INVENTION

1. Field of the Invention

The present invention relates to a profiling technique using sampling and, more specifically, to an information processing device, profile target determining program and method for reducing speed overhead during execution of a program using profiling.

2. Description of Related Art

Many programs dynamically allocate a large number of objects to heap areas in memory. The object format is fixed during program execution in, for example, current Java virtual machine implementation. The fixed object format is the header and data field layout and their size. The memory footprint (memory usage), required memory bandwidth, cache misses, garbage collection (GC) frequency and GC overhead are reduced, and the computer cost for executing the program is also reduced.

The fixed object format is usually changed to reduce the cost and to optimize the program by obtaining information related to access to an object by the profiler during program execution and examining the properties of the object.

For example, when there is a plurality of objects having the property of either not being written or very infrequently being written after initialization (henceforth referred to as "immutable objects") and the content of these objects is identical, the objects can be merged into a single object. Also, if an object is found which has the property of either not being read or very infrequently being read (henceforth referred to as write-only objects), the object can be compressed. Also, if an array object is found in which some array elements are not accessed (henceforth referred to as unaccessed objects), the unaccessed elements can be deleted. This optimization reduces GC frequency and improves cache utilization by saving memory.

In profiling, objects are sampled because the speed overhead is very high when access to all objects is profiled. The speed overhead is still large even when sampling is performed. Depending on the type of program, the execution speed with profiling is at least 40% slower. When the sampling frequency is simply lowered in order to reduce the speed overhead the profile accuracy declines.

The following is a description of the literature discovered in a prior art search for the present invention.

In Japanese Patent Publication No. 2004-0102597, a technique is disclosed in which source information selected based on profile information or user-specified information is inputted, the source information is parsed, the procedure call-up (sub-procedure) attributes called up by the procedure (main procedure) that appear in the source information are analyzed from the analysis results and stored in a procedure analysis table, the main procedure is marked optimization-not-required if the sub-procedure attributes are not registered in the procedure attribute table during inline expansion, main procedures marked optimization-not-required are removed, and the other procedures are optimized. This technique can automatically prevent optimization when there is the possibility of a problem occurring. However, the technique described in Patent Literature 1 does not improve a profiling technique using sampling. Therefore, it cannot reduce speed overhead due to profiling.

In Japanese Patent Publication No. 2005-0071135, a technique is disclosed in which a process is added to record values and their frequency of occurrence to a maximum of two pairs in intermediate-format data when the frequency of the value being given to a variable inside a procedure during execution is at least 50% to obtain primary profile information, adding a process of recording the frequency of occurrence of two values in primary profile information and the number of times the procedure is executed in intermediate-format data to obtain final profile information, determining a value with a frequency of occurrence of at least 50% with respect to a variable based on the final profile information, optimizing the procedure with respect to this value, and generating the target program. In this technique, the number of occurrences of a value given to a variable in a procedure can be estimated without error. In particular, profile information reliably recording values which exceed a 50% frequency of occurrence can be outputted. However, the technique described in Patent Literature 2 does not improve a profiling technique using sampling. Therefore, it cannot reduce speed overhead due to profiling.

In Japanese Patent Publication No. 2002-0304302, an optimization device for microprocessor object code is disclosed which includes a compiling unit for compiling inputted code, which is a compiling program recorded on a recording medium, using profile data to generate primary object code, and a simulator for simulating the primary object code and generating profile data. The simulator in this optimization device analyzes instruction code in the primary object code generated by the compiling unit, executes the instruction code to execute the process corresponding to the instruction code, detects data code with a high access frequency based on data access information, in which the number of times the data code is accessed during execution of the instruction code is recorded by address and size of the accessed data code, the data code is rearranged in a cache area, which is a data code area accessible by a single instruction, secondary object code is generated, the instruction code in the secondary object code is analyzed, and the instruction code is executed. This technique can improve the execution speed of a program because the data code in the object code is rearranged and the method for accessing the data is optimized even when the data code is out of displacement range. However, the technique described in Patent Literature 3 does not improve a profiling technique using sampling. Therefore, it cannot reduce speed overhead due to profiling.

In Japanese Patent Publication No. 1999-0039167, a technique is disclosed in which a resource assigning unit assigns an internal variable generated by a compiler to a machine resource such as a register or memory, an alias accessibility unit records in assigned resource information whether or not there is a possibility of alias access to a memory access instruction included in a sequence of instructions when an assembler code generating unit outputs a sequence of instructions, and an assembler optimization unit references allocation information and optimizes the assembler level. This technique can ease constraints due to the presence of indirect addressing-type memory access instructions, and can improve execution times and program sizes. However, the technique described in Patent Literature 4 does not improve a profiling technique using sampling. Therefore, it cannot reduce speed overhead due to profiling.

SUMMARY OF THE INVENTION

One aspect of the present invention provides a computer program product for determining a profile target for a sampling compiler, where the computer program product having a memory and processor, executes the steps of: storing access-related profile information in response to detecting access to an object set as a profile target on the basis of sampling frequency for each class or object allocation site during execution of a program, calculating the object allocation percentage of an object having properties used in the optimization of the program at the each class or object allocation site on the basis of profile information, and reducing the sampling frequency regarding the class or the object allocation site in which the calculated percentage is below a predetermined threshold value.

Another aspect of the present invention provides a method for determining a profile target for a sampling compiler in an information processing device, where the method includes the steps of: the information processing device storing access-related profile information in response to detecting access to an object set as a profile target on the basis of the sampling frequency for each class or object allocation site during the execution of a program, the information processing device calculating the allocation percentage of an object having properties used in the optimization of the program at each class or object allocation site on the basis of profile information, and the information processing device reducing the sampling frequency regarding a class or object allocation site in which the calculated percentage is below a predetermined threshold value.

Another aspect of the present invention provides an information processing system including: a profile information collection unit for storing access-related profile information in response to detecting access to an object set as a profile target on the basis of the sampling frequency for each class or object allocation site during the execution of a program, and a sampling frequency updating unit for calculating the allocation percentage of an object having properties used in the optimization of the program at each class or object allocation site on the basis of profile information, and for reducing the sampling frequency regarding a class or object allocation site in which the calculated percentage is below a predetermined threshold value.

DETAILED DESCRIPTION OF THE PREFERRED EMBODIMENTS

Figure 1A:
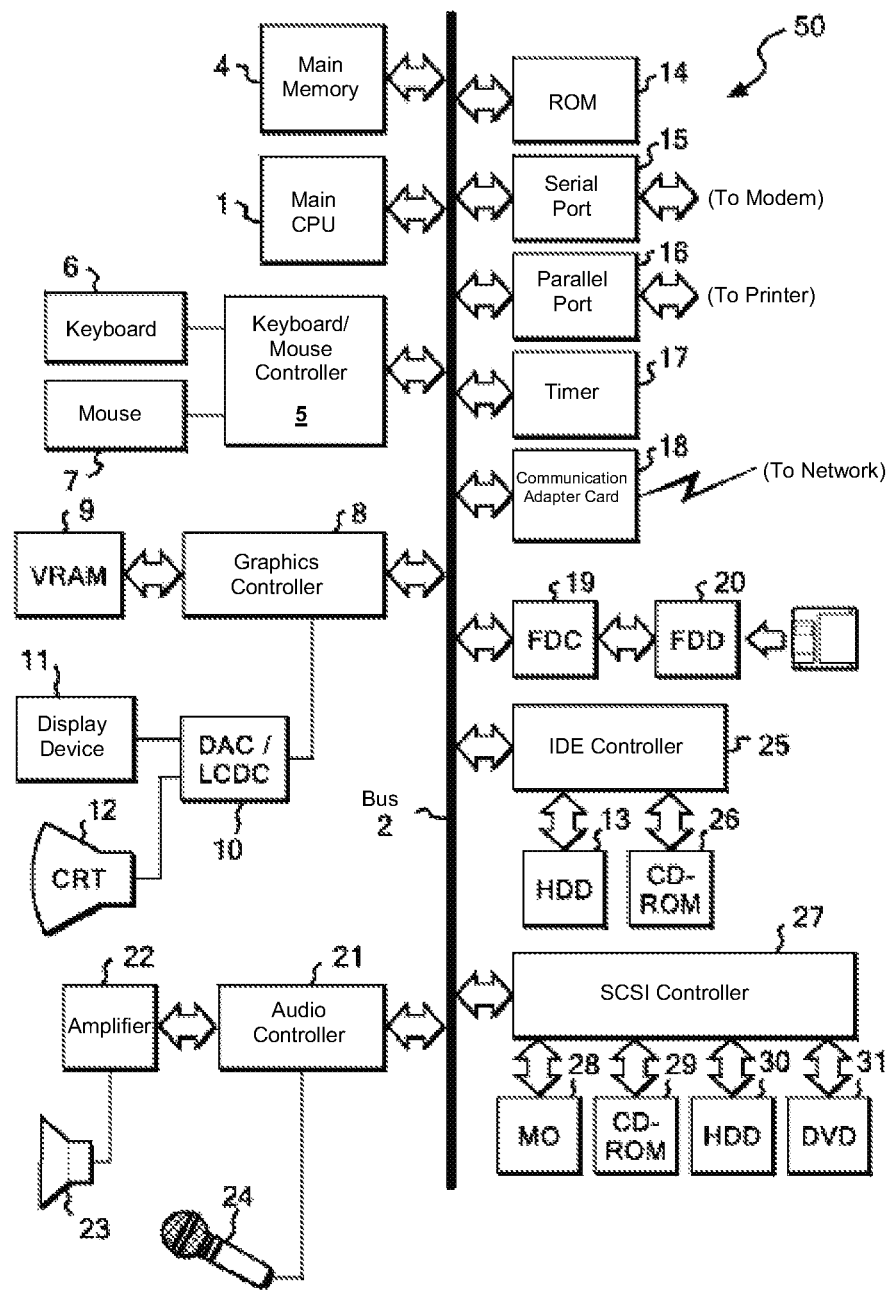
FIG. 1A shows an example of a hardware configuration for a computer 50 in an embodiment of the present invention.

The purpose of the present invention is to solve the aforementioned problem by providing an information processing device, profile target determining program and method for reducing speed overhead due to profiling during program execution without reducing profile accuracy.

The inventor of the present invention conducted research to solve the aforementioned problem and focused on the presence of truly needed profile information and unneeded profile information in the profile information referenced during optimization processing. In other words, what is important in the optimization process is not an accurate number of times an object has been accessed, but the properties of the objects usable in the optimization process, such as immutable objects, write-only objects and unaccessed objects. Therefore, if the access profiles of objects not expressing these properties are omitted, speed overhead can be reduced without reducing profile accuracy. The present inventor conducted further research and, as a result, the idea was conceived to take advantage of the similar properties of objects of the same class and objects allocated at the same allocation sites to calculate the allocation percentage of objects having properties used in the optimization of a program in each class or allocation site, and to reduce the sampling frequency of classes or allocation sites with a low calculated percentage.

Thus, in order to solve the aforementioned problem, the first aspect of the present invention is a program for determining a profile target for a sampling compiler. The program in a computer executes the steps of (a) storing access-related profile information in response to detecting access to an object set as a profile target on the basis of the sampling frequency for each class or object allocation site during the execution of a program, (b) calculating the allocation percentage of an object having properties used in the optimization of the program at each class or object allocation site on the basis of profile information, and (c) reducing the sampling frequency regarding a class or object allocation site in which the calculated percentage is below a predetermined threshold value.

Here, the objects having properties used in the optimization of the program include immutable objects which are not written at all or are written very infrequently after initialization, write-only objects which are not read at all or read very infrequently, and unaccessed objects which have fields that are not accessed.

Preferably, the object set as a profile target is identified by a profile target mark affixed to the pointer indicating the object. The program in a computer executes the steps of (d) determining whether or not the object satisfies the properties used in the optimization of the program in response to detecting access to an object set as a profile target, (e) affixing a profile unnecessary mark to the object on condition that the object does not satisfy the properties used in the optimization of the program, and (f) removing a profile target mark affixed to the pointer indicating an object to which a profile-unnecessary mark has been affixed during the garbage collection process initiated during execution of the program.

Preferably, it is determined that the object does not satisfy the properties used in the optimization of the program in step (d) on condition that access to the detected object is access for writing after initialization of the object. In addition to or instead of this, it can be determined that the object does not satisfy the properties used in the optimization of the program on condition that access to the detected object is access for reading the object. In addition to or instead of this, it can be determined that the object does not satisfy the properties used in the optimization of the program on condition that access to the detected object is access to the final field of the object not having been previously accessed. (Here, "the final field of the object" means there is no other field in the object that has not been accessed prior to this access.)

Preferably, the program also executes the steps of (g) determining whether or not a profile-unnecessary mark has been affixed to the object in response to detecting access to an object set as a profile target, (h) determining whether or not a value in a register storing the pointer indicating the accessed object will be used as an operand for a comparison instruction after the access in response to a determination that a profile-unnecessary mark has been affixed, and (i) removing and rewriting to the register the profile target mark affixed to a pointer indicating an object to which a profile-unnecessary mark has been affixed in response to a determination that the value will not be used as an operand for a comparison instruction.

Preferably, the program also executes the step of (j) determining whether or not a value in a register storing the pointer indicating the object will be used as an operand for a comparison instruction for all access instructions to objects included in the program during the program optimization process, and recording an address of access instructions on condition that a value will not been used as an operand for a comparison instruction. Here, step (h) is performed by searching for the address of the access instruction for the access detected in step (g) among the addresses recorded in step (j).

Preferably, step (j) determines the use of the register value as an operand of a comparison instruction on condition that the register value is used as an argument for a procedure call-up, a procedure return value, an operand for a pointer comparison instruction, or a value written to memory.

The present invention was explained above as a program for determining a profile target for sampling compiler. However, the present invention can also be understood to be a profile target determining method in which the program is installed and executed in a computer. In addition, the present invention can be understood to be an information processing device in which the program has been installed to execute the profile target determining method.

The present invention takes advantage of the similar properties of objects in the same class and objects allocated at the same allocation sites to calculate the allocation percentage of objects having properties used in the optimization of a program in each class or allocation site, and to reduce the sampling frequency of classes or allocation sites with a low calculated percentage. As a result, the access profiles of objects not expressing these properties can be omitted, and the speed overhead can be reduced without reducing profile accuracy. Other effects of the present invention will be understood from the description of each embodiment.

The following is a detailed explanation of a preferred mode of embodying the present invention with reference to the drawings. However, the embodiment explained below does not limit the present invention in the scope of the claims, and all of the combinations of characteristics explained in the embodiment are not necessarily essential to the solution of the present invention. The present invention can be embodied in many different modes, and should not be construed as limited to the contents of the described embodiment. In addition, the same components and elements are denoted by the same numbers throughout the description of the embodiment.

FIG. 1 shows an example of a hardware configuration for the computer 50 in an embodiment of the present invention. The computer 50 includes a main central processing unit (CPU) 1 and a main memory 4 connected to a bus 2. Preferably, the CPU 1 is based on a 32-bit or 64-bit architecture. Examples include the Core i (trademark) series, the Core 2 (trademark) series, the Atom (trademark) series, the Xeon (trademark) series, the Pentium (trademark) series, and the Celeron (trademark) series from Intel, and the Phenom (trademark) series, the Athlon (trademark) series, the Turion (trademark) series, and the Sempron (trademark) series from AMD.

The hard disk devices 13, 30 and removable storage (an external storage system with replaceable recording media) such as CD-ROM devices 26, 29, floppy disk device 20, MO device 28, and DVD device 31 are connected to the bus 2 via floppy disk controller 19, IDE controller 25, and SCSI controller 27, etc. Storage media such as a floppy disk, MO, CD-ROM and DVD-ROM are inserted into the removable storage.

Programs, such as the operating system, a Java (registered trademark) processing environment such as J2EE, Java (registered trademark) applications, Java (registered trademark) virtual machines (VM), and Java (registered trademark) just-in-time (JIT) compilers, as well as data, are stored in the storage media, hard disk devices 13, 30 and ROM 14 so as to be loaded in the main memory 4. Computer programs can also be recorded in the storage media and in the hard disk devices 13, 30 and the ROM 14 to work with the operating system, give instructions to the CPU 1, and embody the present invention. In other words, a profile target determining program and data can be recorded in the various storage devices mentioned above and installed on the computer 50 to get the computer 50 to function as a profile target determining device 200 in an embodiment of the present invention.

The profile target determining program includes a mark setting module, initializing module, call-up setting module, verification module, profile information collection module, removal determining module, sampling frequency updating module, removal module, immediate removal module and code rewriting module. The program and modules work with the CPU 1 to make the computer 50 function as a mark setting unit 202, initializing unit 203, call-up setting unit 205, verification unit 210, profile information collection unit 220, removal determining unit 230, sampling frequency updating unit 235, removal unit 245, immediate removal unit 250 and code rewriting unit 255. These units are described below. The computer program can be compressed, divided into a plurality of programs, and stored in a plurality of media.

The computer 50 receives input from an input device such as a keyboard 6 or mouse 7 via the keyboard/mouse controller 5. The computer 50 receives input from the microphone 24 via the audio controller 21, and outputs audio from the speaker 23. The computer 50 is connected to the display device 11 for providing visual data to the user via the graphics controller 10. The computer 50 is connected to a network via a network adapter 18 (Ethernet (registered trademark) card, token-ring card, etc.) so as to be able to communicate with other computers.

From this description, it should be clear that the computer 50 can be realized by an information processor such as an ordinary personal computer, workstation or main frame, or a combination thereof. The components described above are illustrative, and all of the components are not to be considered essential components of the present invention.

Figure 1B:
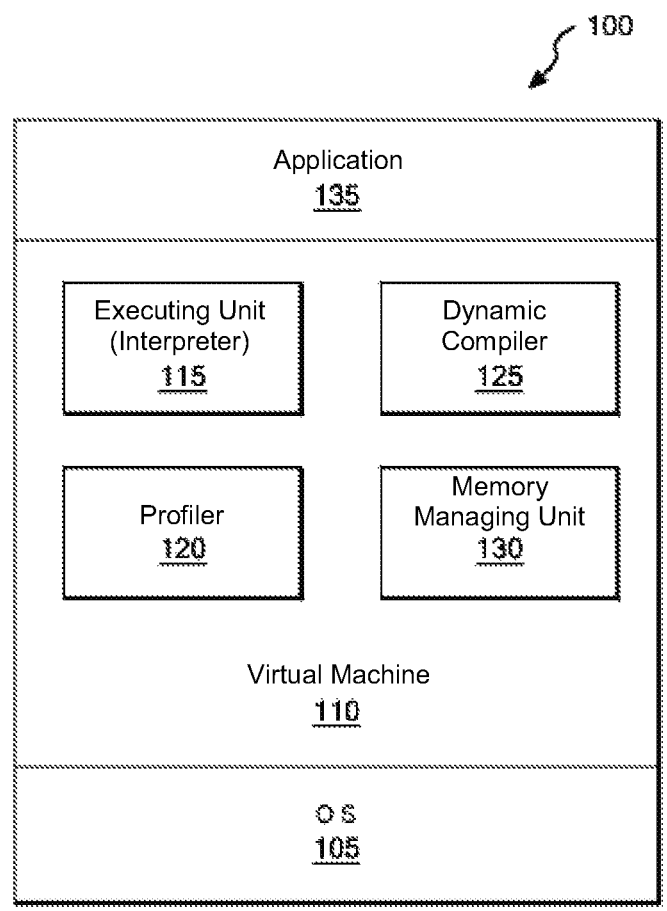
FIG. 1B shows an example of a hardware configuration for a computer 50 in an embodiment of the present invention.

FIG. 1B is a block diagram showing the software configuration used to realize the present invention. In this drawing, the operating system 105 manages the CPU and memory as resources and realizes a multi-thread function using time division. The virtual machine 110 is software serving as an interface between an application 135 and the operating system 105. Viewed from the perspective of the application 135 the entire hierarchy of the virtual machine acts as a Java virtual machine. The virtual machine 110 includes an executing unit (interpreter) 115 for interpreting a program provided in intermediate code such as byte code, a profiler 120 called up in response to this interpretation, and a memory managing unit 130. Also, the virtual machine 110 preferably includes a dynamic compiler 125 such as a JIT compiler, generates native code compiled into machine language dynamically from byte code during execution, and speeds up execution of the program.

A conventional optimization process performed on the basis of profiling using object sampling will be explained before describing the virtual machine in FIG. 1B in greater detail. In the conventional optimization process, the following actions are carried out in accordance with the properties of an object indicated by profile information:

(1) When a plurality of immutable objects having the property of either not being written or being infrequently written after initialization are found and their content is the same, the objects are combined into a single object.

(2) When a write-only object having the property of either not being read or being infrequently read is found, the object is compressed.

(3) When an unaccessed object is found in which some array elements are not accessed, the unaccessed elements are deleted.

This optimization reduces GC frequency and improves cache utilization by saving memory.

However, as mentioned above, conventional profiling using object sampling leads to speed overhead. Therefore, the present inventor focused on the properties of objects and not the number of times an object is accessed as the key to the optimization process, and noted the similar properties of objects in the same class and objects allocated at the same allocation sites. An idea was conceived to take advantage of this to calculate the allocation percentage of objects having properties used in the optimization of a program in each class or allocation site, and to reduce the sampling frequency of classes or allocation sites with a low calculated percentage. The profile target determining device 200 in an embodiment of the present invention incorporates this idea to determine profile targets so that profile information can be collected in which only access to objects truly necessary to optimization is targeted. The following is a detailed explanation of each configurational element in the profile target determining device 200 of an embodiment of the present invention. The process in (1) through (3) above is illustrative for the purposes of explaining the embodiment. Needless to say, the present invention can be applied as described below to profiling for optimization on the basis of the properties of other objects.

Figure 2:
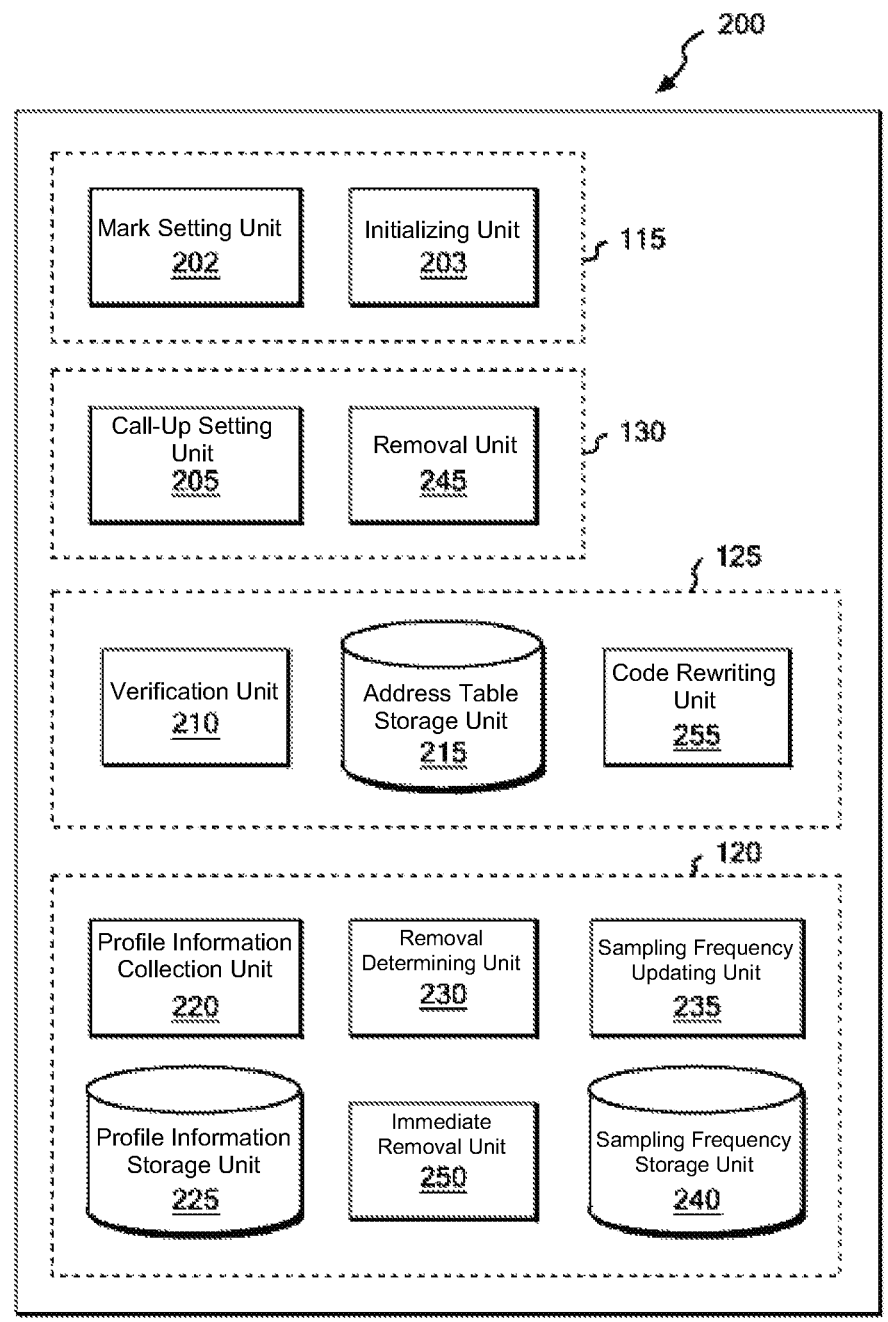
FIG. 2 shows a functional configuration of a profile target determining device 200 in an embodiment of the present invention.

FIG. 2 shows a functional configuration of a profile target determining device 200 in an embodiment of the present invention which has the hardware functions of the computer 50 shown in FIG. 1A and which has the software configuration shown in FIG. 1B. The profile target determining device 200 in this embodiment of the present invention includes a mark setting unit 202, initializing unit 203, call-up setting unit 205, verification unit 210, profile information collection unit 220, removal determining unit 230, sampling frequency updating unit 235, removal unit 245, immediate removal unit 250 and code rewriting unit 255. The profile target determining device 200 also includes an address table storage unit 215 for storing an address table in which the addresses of object access instructions determined on the basis of the verification results of the verification unit 210 are registered, a profile information storage unit 225 for storing profile information collected by the profile information collection unit 220, and a sampling frequency storage unit 240 for storing the sampling frequency updated by the sampling frequency updating unit 235. The functions of the mark setting unit 202 and the initializing unit 203 can be implemented as functions of the executing unit 115 shown in FIG. 1B. The functions of the call-up setting unit 205 and the removal unit 245 can be implemented as functions of the memory storage unit 130 shown in FIG. 1B. The functions of the verification unit 210, the address table storage unit 215 and the code rewriting unit 255 can be implemented as functions of the dynamic compiler 125 shown in FIG. 1B. The profile information collection unit 220, profile information storage unit 225, removal determining unit 230, sampling frequency updating unit 235, sampling frequency storage unit 240 and immediate removal unit 250 can be implemented as functions of the profiler 120 shown in FIG. 1B.

The mark setting unit 202 determines whether or not an allocated object is a profile target on the basis of the sampling frequency for each class or object allocation site, and sets a profile-target indicating mark in the pointer to an object determined to be a profile target.

Here, sampling frequency is the frequency at which sampling is performed, such as sampling an object each time 1 MB is allocated. In the prior art, a single sampling frequency with a fixed value is used. In the present invention, a sampling frequency is prepared for each class and object allocation site, and profiling is not performed on objects that do not have a property used in optimization.

The sampling frequency for each class or object allocation site is initialized using the same predetermined value immediately before or immediately after start of the execution target program. Mark setting can also be performed, for example, using a single lower empty bit in a pointer as a flag, or by adding an offset to the pointer which points outside of the heap area. The mark setting unit 202 performs mark setting, for example, during allocation of an object or during garbage collection.

The initializing unit 203 generates, initializes and stores profile information with a predetermined data structure in the profile information storage unit 225 so that the profile information collection unit 220 described below can store collected profile information in the profile information storage unit 225 using a predetermined data structure. This predetermined data structure is a structure used to store collected profile information efficiently, and includes a profile information structure for each object, a profile information structure for each class, and a profile information structure for each object allocation site.

The profile information structure for each object has a first field for storing an identifier for identifying the object allocation site (henceforth referred to as the "allocation site ID") and a second field for storing information used to determine whether or not the object has a property used in optimization. Because information stored in the second field depends on the type of optimization performed, in this explanation optimization is performed on objects using immutability, write-only properties and inaccessibility.

In optimization using the immutability of objects, objects having the property of either not being written or very infrequently being written after initialization have to be identified. A single bit indicating whether or not the object has been read even once is stored in the second field. (A single bit indicating "not read" is set in this bit as the initial value.) In optimization using the write-only properties of objects, objects having the property of either not being read or very infrequently being read have to be identified. However, this property can be determined when an object does not have write-only properties immediately after having been accessed for "read". In this case, no information is stored in the second field. (In the case of an object that is very infrequently read, a count value or read frequency information is stored to indicate the number of times the object has been read.) In optimization using the inaccessibility of an object, array objects having some unaccessed array elements have to be identified. A single bit indicating whether or not each byte in the object has been accessed is stored in the second field. (A single bit indicating "not accessed" is set in this bit as the initial value.)

The initializing unit 203 generates and initializes a profile information structure for each object under conditions in which an object is determined to be a profile target during allocation of the object. The initializing unit 203 generates an empty hash table (henceforth referred to as the "first hash table") and stores the table in the profile information storage unit 225. Each time a profile information structure is generated for an object, the profile information structure is registered in the first hash table with the start address of the object as a key. At this time, the initializing unit 203 stores the ID of the object allocation site in the first field of the profile information structure of each object. Initialization of the value in the second value of the profile information structure of each object depends on the type of initialization to be performed, and object optimization uses the immutability, write-only properties and inaccessibility of objects as described above.

The profile information structure by class has a first field for storing the total number of bytes in objects of the allocated class ("0" is set in the field as the initial value), and a second field for storing the total number of bytes in all objects of the allocated class having properties used in the optimization ("0" is set in the field as the initial value). For example, in optimization using the immutability of objects where the class of interest is Class A, the total number of bytes for objects allocated for Class A is stored in the first field of the profile information structure for Class A, and the total number of bytes in immutable objects allocated for Class A is stored in the second field of the profile information structure for Class A. The profile information structure for each allocation site is similar. In other words, the profile information structure for each allocation site has a first field for storing the total number of bytes in objects allocated at allocation sites ("0" is set in the field as the initial value), and a second field for storing the total number of bytes in all objects allocated at allocation sites that have properties used in the optimization ("0" is set in the field as the initial value).

The initializing unit 203 generates and initializes a profile information structure for each class or a profile information structure for each allocation site under conditions in which an object is determined to be a profile target during object allocation, and an allocated object is the initial object in a class of objects or the initial object allocated at an allocation site. The initializing unit 203 generates an empty hash table (henceforth referred to as the "second hash table") or an empty array (henceforth referred to as the "first array"), stores this in the profile information storage unit 225. When a profile information structure for each class is generated, the structure is registered in the second hash table using an identifier for identifying the class (henceforth referred to as a "class ID") as the key, or in the first array using the class ID as an index. Similarly, when a profile information structure for each allocation site is generated, the structure is registered in the second hash table using an allocation site ID as the key, or in the first array using the allocation site ID as an index. When the initializing unit 203 generates and initializes a profile information structure for each object separate from generating and initializing a profile information profile for each class and profile information structure for each allocation site (that is, generating a subsequent profile information structure for each object when the corresponding profile information structure for each class or the corresponding profile information structure for each allocation site has not been generated), the number of bytes in the allocated object is added to the first field and the second field of the profile information structure for each corresponding class or the profile information structure for each allocation site.

The call-up setting unit 205 sets the call up of the profiler 120 so that the profiler 120 is called up when an object is accessed via a pointer with an affixed profile target mark. The setting can be performed by rewriting code (intermediate code) in the execution target program or by using the page protecting mechanism. The call-up setting unit 205 uses the latter method, and the code rewriting unit 255 described below uses the former method. Therefore, it should be noted that the profile target determining device 200 can include a call-up setting unit 205 and/or a code rewriting unit 255 which is described below.

More specifically, a call-up setting unit 205 using a page protecting mechanism sets the destination page indicated by a pointer with an affixed profile target mark to read-write prohibited, and calls up a signal handler when an object is accessed via this pointer. In this situation, the signal handler collects profile information as a profiler 120. The call-up setting unit 205 can establish the profiler 120 call-up setting, for example, immediately before or immediately after the execution target program is started.

The verification unit 210 verifies whether or not the value in each of the base registers storing the values for the pointers used in access instructions to objects included in the intermediate code of the execution target program is used as an operand for a pointer comparison instruction after the access instruction. The verification unit 210 registers the address of the access instruction in the address table stored in the address table storage unit 230 when it has been determined as a result of verification that the value is not used in a point comparison instruction. The address table is initialized using a blank value immediately before or immediately after start of the execution target program. When the address table becomes too large, it can be set so that only the addresses of instructions for procedures executed frequently are registered. How the address table is used will be described below.

More specifically, the verification unit 210 analyzes the intermediate code in the execution target program to determine whether or not the value in a base register storing a pointer to an object is used as an argument for a procedure call-up, a procedure return value, an operand for a pointer comparison instruction, or a value written to memory. The verification unit 210 preferably uses inter-procedural analysis to repeatedly analyze and determine call-up destination procedures or call-up source procedures when the value in the base register is used as an argument for procedure call-up or a procedure return value. Also, the verification unit 210 preferably uses alias analysis, and uses the results of the alias analysis to determine whether or not the value in the base register or a copied value is used as the operand in a pointer comparison instruction.

When inter-procedural analysis or alias analysis is not used, the verification unit 210 conservatively determines the possibility of a base register value being used in a pointer comparison instruction when a base register value storing a pointer to an object is one of the following: an argument for a procedure call-up, a procedure return value, a value written to memory, or an operand for a pointer comparison instruction. The verification unit 210 can perform verification and address table creation, for example, during dynamic compiling of some of the intermediate code in the execution target program.

In response to the call up of the profiler 120 or signal handler, that is, in response to the detection of access to an object set as a profile target, the profile information collection unit 220 collects the profile information related to the access. The profile information collection unit 220 stores the collected profile information in a structure for profile information described above. More specifically, the profile information collection unit 210 references the first hash table using the start address of the accessed object as the key, and obtains the profile information structure for each object corresponding to the object. The profile information collection unit 220 stores the information needed to determine whether or not the properties used in optimization are satisfied by the accessed object in the second field of the obtained profile information structure for each object.

For example, during optimization using object immutability, the profile information collection unit 220 posts a single bit stored in the second field to indicate "read" access if the current access is "read" access, and does nothing if the current access is "write" access. During optimization using the write-only properties of objects, the profile information collection unit 220 stores nothing in the second field as explained above. During optimization using object inaccessibility, the profile information collection unit 220 posts a bit corresponding to a byte of the accessed object. The profile information collection unit 220 performs profile information collection, for example, during profiling performed when the execution target program is executed. The profile information collection unit 220 calls up the removal determining unit 230 when the collected profile information has been stored.

When called up by the profile information collection unit 220, the removal determining unit 230 determines whether or not the accessed object satisfies the properties used in program optimization on the basis of the profile information stored in the profile information storage unit 225. The removal determining unit 230 sets a profile-unnecessary mark in the object under conditions in which it has been determined that the object does not satisfy the properties used in the optimization of the program. This is because the object has no value for profiling when it does not satisfy or has not satisfied the properties used in program optimization. The removal determining unit 230 can be acquired by receiving from the profile information collection unit 220 a pointer to the corresponding profile information structure for each object or by referencing the first hash table using the start address of the currently accessed object as a key.

During optimization using object immutability, the removal determining unit 230 determines that an object does not satisfy the properties used in program optimization under conditions in which access to the detected object is access for writing after initialization of the object. These conditions are satisfied when the value of the flag in the second field of the acquired corresponding profile information structure for each object is "1", which indicates that it has been "read" at least once and when the current access is "write" access.

During optimization using the write-only properties of objects, the removal determining unit 230 determines that an object does not satisfy the properties used in program optimization under conditions in which access to the detected object is access for reading the object. More specifically, these conditions are satisfied when the current access is "read" access.

During optimization using object inaccessibility, the removal determining unit 230 determines that an object does not satisfy the properties used in program optimization under conditions in which access to the detected object is access to the final field of the object not having been previously accessed. These conditions are satisfied when the values of all flags in the second field of the acquired corresponding profile information structure for each object is "1", which indicates that it has been accessed.

The header of an object is used to affix a profile-unnecessary mark to the object. In other words, an object typically includes a header and at least one field. The header is a portion embedded in the object for holding information on the object itself. For example, it includes the class ID of the object and the size of the object. This field is accessible by the user of the object and has two types of data, for example, pointer and non-pointer. A pointer is a value referencing a certain location in a memory area. In many language processing systems, the pointer to an object references the start address of the object. A non-pointer contains a value used in programming itself. It can include numbers, characters, and/or Boolean values. A bit in the header of the object can be used as a flag to affix a profile-unnecessary mark.

The determination results of the removal determining unit 230 remain in the corresponding profile information structure for each class or the corresponding profile information structure for each allocation site. More specifically, the removal determining unit 230 references the second hash table using the class ID embedded in the header of an accessed object as a key, and acquires the corresponding profile information structure for each class. Then, for determination results indicating that the properties used in program optimization are not satisfied, the removal determining unit 230 subtracts the number of bytes of the accessed object from the total number of bytes in all allocated objects having properties used in optimization stored in the second field of the structure. Similar processing is performed in the case of a profile information structure for each allocation site. However, in this case, the allocation site ID is acquired from the first field of the corresponding profile information structure for each object.

When subtraction is performed in this process, the removal determining unit 230 determines the necessity for a sampling frequency update. First, the removal determining unit 230 calculates the percentage of allocated objects with properties used in program optimization at each class or object allocation site on the basis of profile information stored in the profile information storage unit 225. More specifically, the removal determining unit 230 calculates this percentage by determining the total number of bytes in allocated objects with properties used in optimization stored in the second field relative to the number of bytes in all allocated objects stored in the first field of all of the sampling information structures for each class or in all of the sampling information structures for each allocation site.

Next, the removal determining unit 230 compares the percentage determined for each class or object allocation site to a predetermined threshold value, and determines that a sampling frequency update is required for a class or object allocation site when the calculated percentage is lower than the predetermined threshold value. The predetermined threshold value can be determined via experimentation, but a numerical value such as 1% can also be used. When, as a result, it has been determined that a sampling frequency update is required, the removal determining unit 230 calls up the sampling frequency updating unit 235 described below. The removal determining unit 230 can perform this series of actions, for example, in the profiling performed during execution of the execution target program.

When called up by the removal determining unit 230, the sampling frequency updating unit 235 reads from the sampling frequency storage unit 240 the sampling frequency for a class or object allocation site determined by the removal determining unit 230 to have a calculated percentage lower than the predetermined threshold value, reduces the read value, and writes back the value to the sampling frequency storage unit 240. Here, the sampling frequency can be reduced by subtracting a predetermined value from the sampling frequency or by dividing the sampling frequency by a predetermined value. However, a predetermined lower limit is provided because the accuracy of the profiling falls off when the frequency reaches zero. For example, $\frac{1}{8}$ MB (one sampling per 8 MB allocated) can be set as the initial value, the current sampling frequency can be set so as to be divided by two each time the frequency is reduced, and $\frac{1}{512}$ MB (one sampling per 512 MB allocated) can be set as the lower limit value. The updated sampling frequency stored in the sampling frequency storage unit 240 is referenced during the next sampling when the mark setting unit 202 determines the profile target. The sampling frequency updating unit 235 performs the sampling frequency update in the profiling performed during execution of the execution target program.

The removal unit 245 determines whether or not a profile-unnecessary mark has been set in an object when all of the pointers used to detect unused objects are scanned during garbage collection initiated during program execution. The removal unit 245 removes a profile target mark affixed to a pointer to an object under conditions in which it has been determined that a profile-unnecessary mark has been set for the object.

The removal processing is performed in garbage collection performed during execution of the program for the following reason. Profile target marks have to be removed from all pointers to objects in order to remove the objects as profile targets. Otherwise, there are two different pointer values referring to the same object, and the pointer comparison does not operate properly. However, in this method, access to objects is needlessly profiled until the next garbage collection after profile-unnecessary marks are affixed. In order to eliminate this problem, an immediate removal unit 250 is provided in the present invention.

In response to the call up of the profiler 120 or signal handler, that is, in response to detection of access to an object set as a profile target, the immediate removal unit 250 determines whether or not a profile-unnecessary mark has been affixed to the object. Next, the immediate removal unit 250 determines whether or not the value of the base register storing a pointer to the accessed object is used as a comparison instruction operand subsequent to access under conditions in which it has been determined that a profile-unnecessary mark has been affixed to the object. Then, the immediate removal unit 250 removes the profile target mark from the pointer to the object and writes it back to the base register under conditions in which it has been determined that the value in the base register is not used as a comparison instruction operand. The immediate release unit 250 performs instant removal, for example, in profiling performed during execution of the execution target program.

Here, when there is a profile-unnecessary mark affixed to an object, removal of the profile target mark affixed to the pointer referring to the object is performed under conditions in which the value of the base register storing the pointer is not used as a comparison instruction operand subsequent to the detected access for the following reason. As mentioned above, profile target marks have to be removed from all pointers to objects in order to remove the objects as profile targets or else there are two different pointer values referring to the same object, and the pointer comparison does not operate properly. However, if a pointer with a profile target mark to be removed is not used in a pointer comparison instruction, this problem does not occur even when the profile target mark has been removed from the pointer. As a result, a benefit is obtained in that at least needless profiling is not performed until the next garbage collection regarding access via pointers whose profile target mark has been removed.

The immediate removal unit 250 determines whether or not the value in a base register is used as the operand in a comparison instruction using the address table stored in the address table storage unit 230. In other words, the immediate removal unit 250 references the address table and determines whether or not the address of the access instruction indicating access to an object with an affixed profile-unnecessary mark has been registered. When the address of the access instruction has been registered, the immediate removal unit 250 determines that the value in the base register is not used as the operand of a comparison instruction during subsequent execution of the program.

Figure 3A:
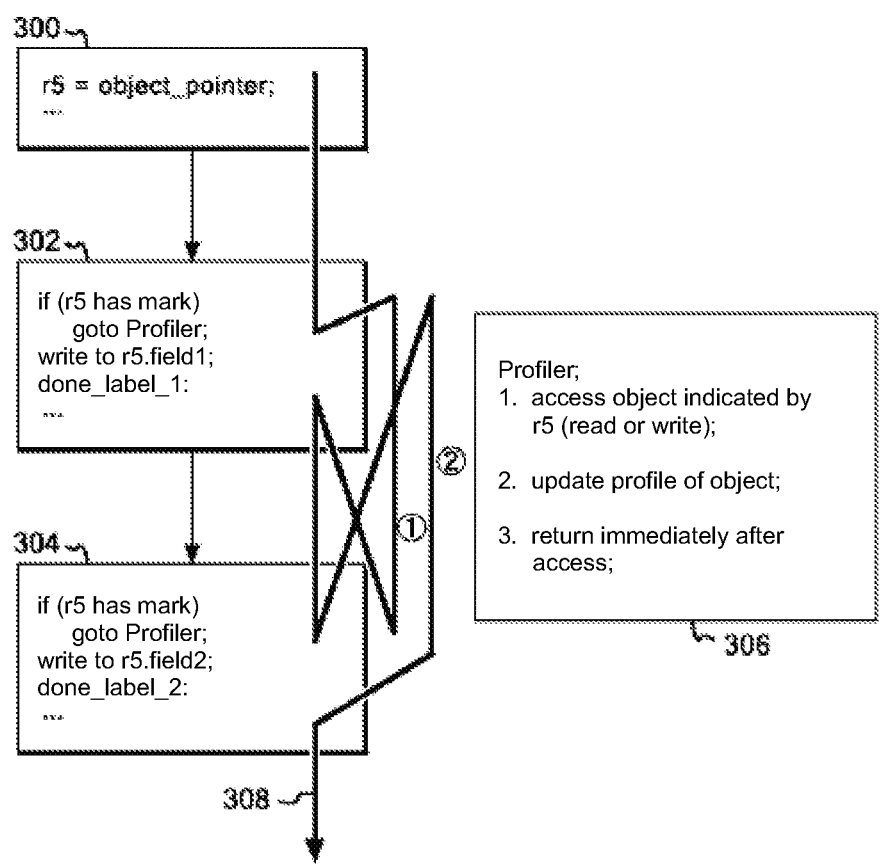
FIG. 3A shows an example of a program execution trajectory when a profiler without a mark removing function is used in an embodiment of the present invention.
Figure 3B:
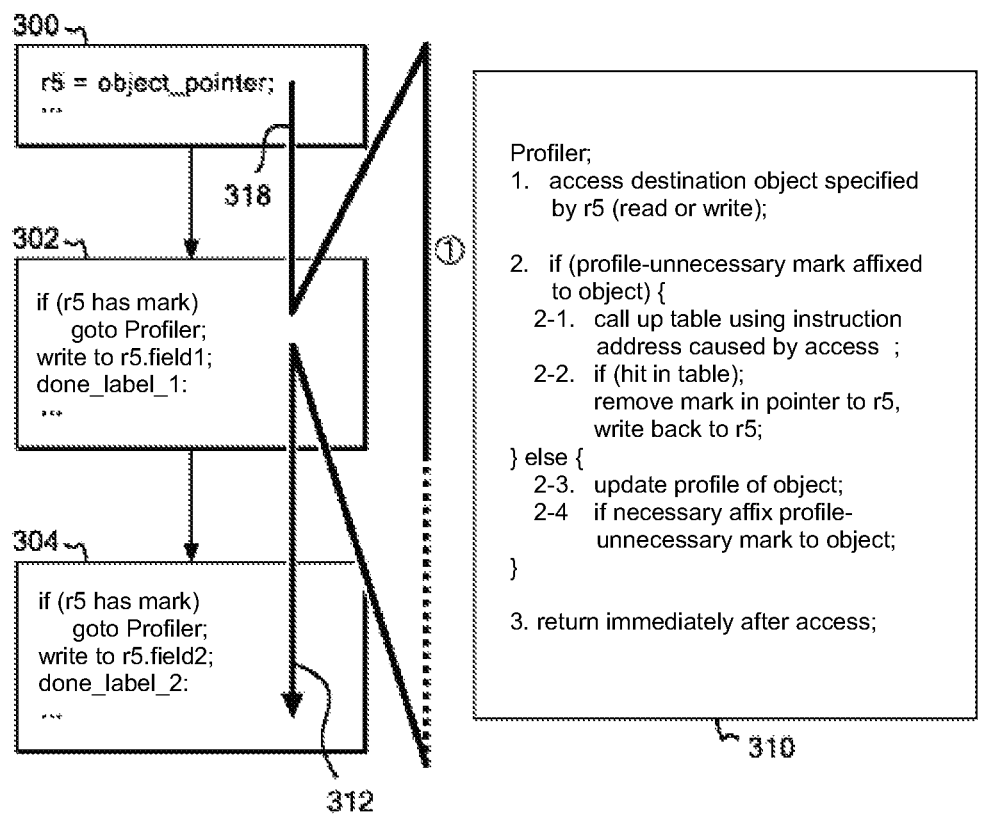
FIG. 3B shows an example of a program execution trajectory when a profiler with a mark removing function is used in an embodiment of the present invention.

Referring to FIG. 3A and FIG. 3B, the following explains the difference in the number of times profiling is performed under certain conditions when the same program is executed by a profiler incorporating the removal determining unit 230 and the immediate removal unit 250 and by a profiler not incorporating these units.

FIG. 3A shows an example of the program execution trajectory when a profiler is called up that does not have the functions of the removal determining unit 230 and the immediate removal unit 250. In Block 300, the pointer object_pointer is set in register r5. Here, the pointer object_pointer has a profile target mark affixed. Next, the process advances to Block 302 where it is determined by the "if" statement whether or not the pointer set in register r5 is a pointer with a profile target mark affixed. Because the pointer has a profile target mark affixed, the determination result is true, the profiler is called up, and the profiling process 306 is executed.

The profiling process 306 shown in FIG. 3A includes (1) accessing the destination object referred to by the pointer set in register r5, (2) updating the profile information in the accessed object, (3) and returning immediately after the current access instruction. Therefore, the profiler is called up in response to the access instruction "write to r5.field1" in Block 302, and the profile information for the object referred to by the pointer set in register r5 is updated on the basis of writing to field 1 of the object. The process returns to done_Label_1 immediately after access instruction "write to r5.field1".

Next, the process advances to Block 304, where it is determined again using the "if" statement whether or not the pointer set in register r5 is a pointer having an affixed profile target mark. Because the value in register r5 has not been updated, the determination result at this time is true, the profiler is called up, and the profiling process 306 is executed. Therefore, the profiler is called up in response to the access instruction "read from r5.field2" in Block 304, and the profile information for the object referred to by the pointer set in register r5 is updated on the basis of reading from field 2 of the object. The process returns to done_Label_2 immediately after access instruction "read from r5.field2".

When a profiler without the functions of the removal determining unit 230 and the immediate removal unit 250 is used as described above, once a profile target mark has been affixed, the mark is not removed from a pointer at least until the next garbage collection. In the example shown in FIG. 3A, the profiler is called up and the profiling process 306 is executed no matter what object is accessed via register r5 in Block 302 and Block 304 (see arrow 308 indicating the execution trajectory).

FIG. 3B shows an example of the program execution trajectory when a profiler is called up that has the functions of the removal determining unit 230 and the immediate removal unit 250. Note that the program shown in FIG. 3B (including Block 300 through Block 304) is the same as the program shown in FIG. 3A (including Block 300 through Block 304). First, in Block 300, the pointer object_pointer with an affixed profile target mark is set in register r5. Next, the process advances to Block 302 where it is determined by the "if" statement whether or not the pointer set in register r5 is a pointer with a profile target mark affixed. Because the pointer has a profile target mark affixed, the determination result is true, the profiler is called up, and the profiling process 310 is executed.

The profiling process 310 shown in FIG. 3B includes (1) accessing the destination object referred to by the pointer set in register r5, (2) determining whether or not a profile-unnecessary mark has been affixed to the object, (2-1) using the address table to reference the address of the access instruction for accessing the current object when a profile-unnecessary mark has been affixed to the object, (2-2) determining whether or not there is a bit in the address table, extracting the pointer in register r5 and removing the profile target mark when there is a bit, and writing back to register r5, (2-3) updating the object profile when a profile-unnecessary mark is not affixed to the object, and (2-4) affixing a profile-unnecessary mark to the object when the object does not satisfy the properties used in optimization. Here, action 2-4 corresponds to the removal determining unit 230, and actions 2, 2-1 and 2-2 correspond to the immediate removal unit 250.

Therefore, the profiler is called up in response to the access instruction "write to r5.field1" in Block 302, and it is determined whether or not the object referred to by the pointer set in register r5 has a profile-unnecessary mark affixed. Here, a profile-unnecessary mark is affixed to the object, the address of access instruction "write to r5.field1" is registered in the address table, and it is verified that the value in register r5 is not used as an operand in a pointer comparison instruction in the processing subsequent to the access instruction "write to r5.field1". In the profiling process 310, the pointer with the profile target mark removed is written back to the register r5, and the process returns to done_Label_1 immediately after access instruction "write to r5.field1".

Next, the process advances to Block 304, where it is determined whether or not the pointer set again in register r5 from the "if" statement is a pointer with a profile target mark. Because, as mentioned above, the profile target mark has been removed from the pointer in profiling process 310, the determination result is false this time. The profiler is not called up, and access instruction "read from r5.field2" is executed.

As mentioned above, in a profiler incorporating the functions of the removal determining unit 230 and the immediate removal unit 250, the object indicated by the pointer does not have properties used in optimization afterwards, even when a profile target mark was once affixed to the pointer. Also, the profile target mark is removed when it has been verified that the value in the register storing the pointer is not used in a pointer comparison instruction in the subsequent processing. Therefore, in the example shown in FIG. 3B, the profiler is not called up with respect to access to an object via register r5 in Block 304 after the conditions have been satisfied. This has the merit of not requiring unnecessary execution of the profiling process 310 (see arrow 312 indicating the execution trajectory).

Returning to FIG. 2, the code rewriting unit 255 sets the profiler call-up so that the profiler is called up when there is access to an object via a pointer with a profile target mark. As mentioned above, the code rewriting unit 255 sets the profiler call-up by rewriting code. More specifically, before all access instructions to objects via pointers in the execution target program, the code rewriting unit 255 inserts code determining whether or not there is a profile target mark and code calling up the profiler based on determination results indicating the affixing of such a mark (see the "if" statement in the first line and the "goto" jump instruction in the second line of Block 302 in FIG. 3 B). The code rewriting unit 255 performs the code rewriting process during dynamic compiling of, for example, intermediate code serving as an execution target program.

Figure 4:
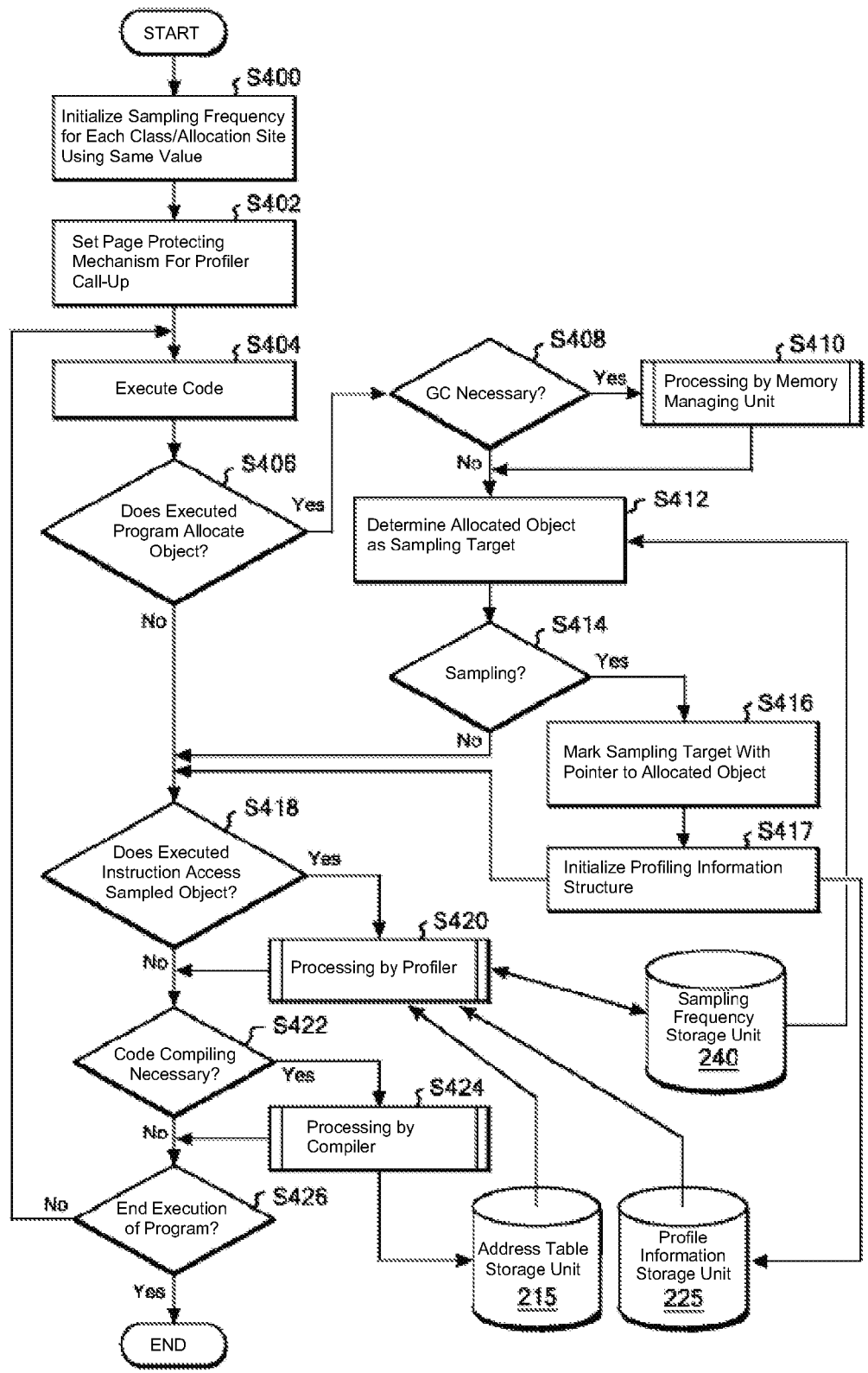
FIG. 4 shows an example of an operational flow of the profile target determining device 200 in an embodiment of the present invention.
Figure 5:
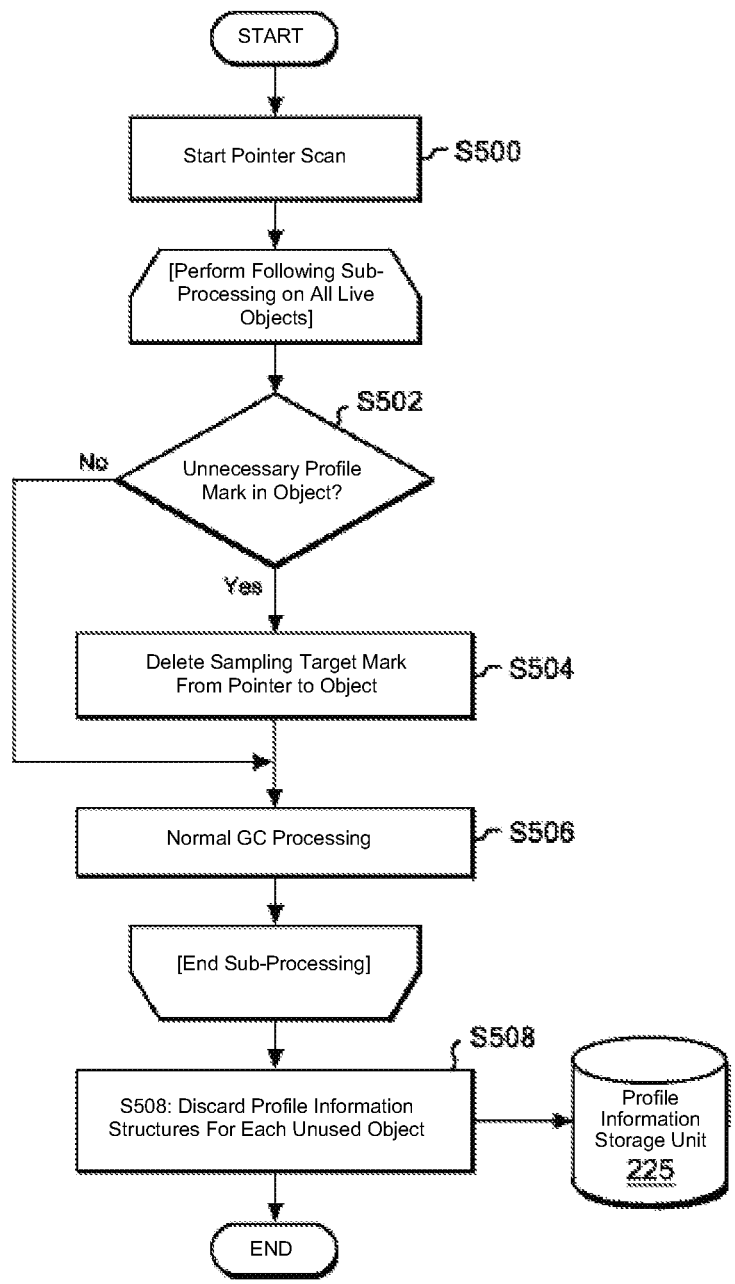
FIG. 5 shows an example of a detailed operational flow of the processing performed by the memory storage unit 130 in Step 410 shown in FIG. 4.
Figure 6:
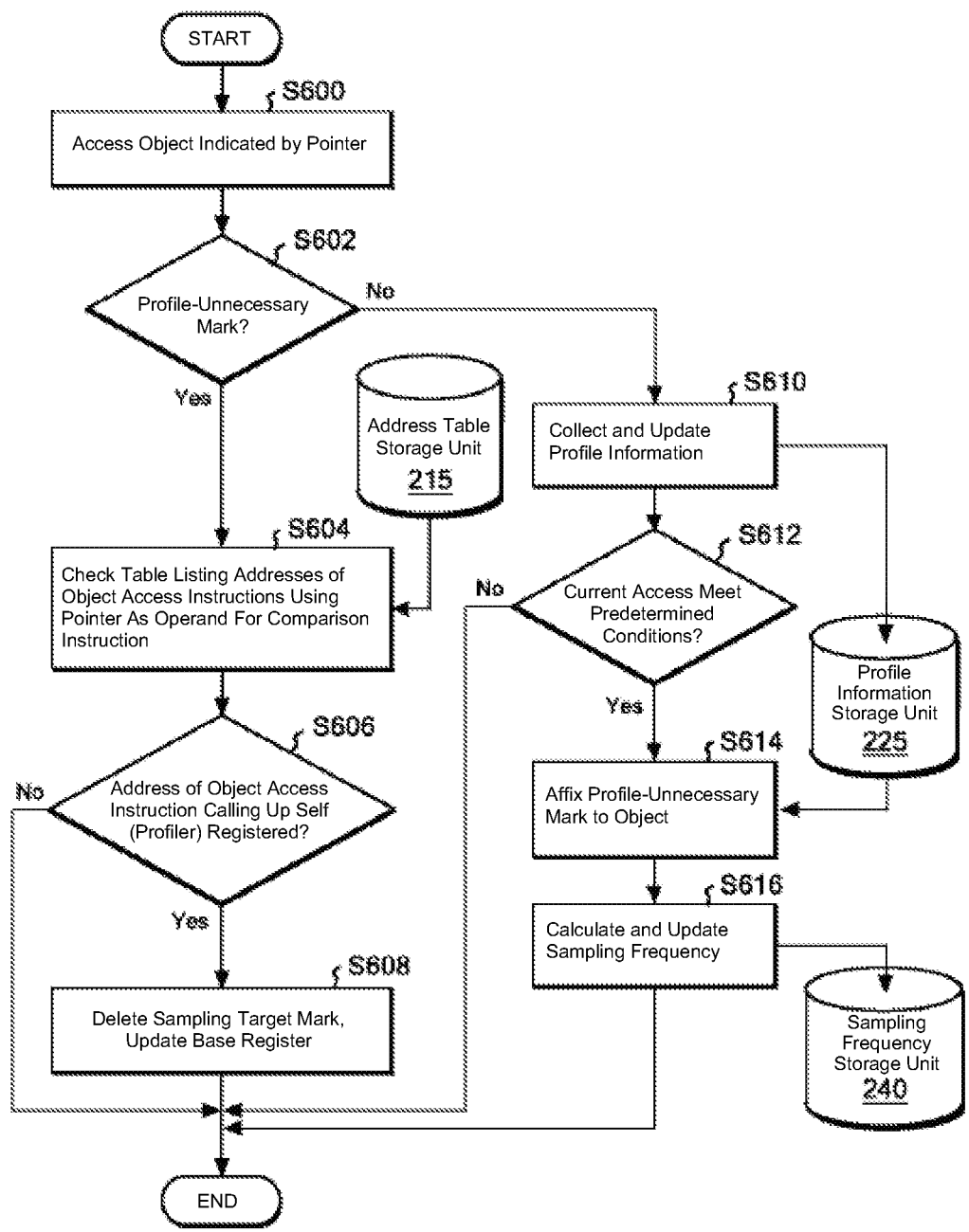
FIG. 6 shows an example of a detailed operational flow of the processing performed by the profiler 120 in Step 420 shown in FIG. 4.
Figure 7A:
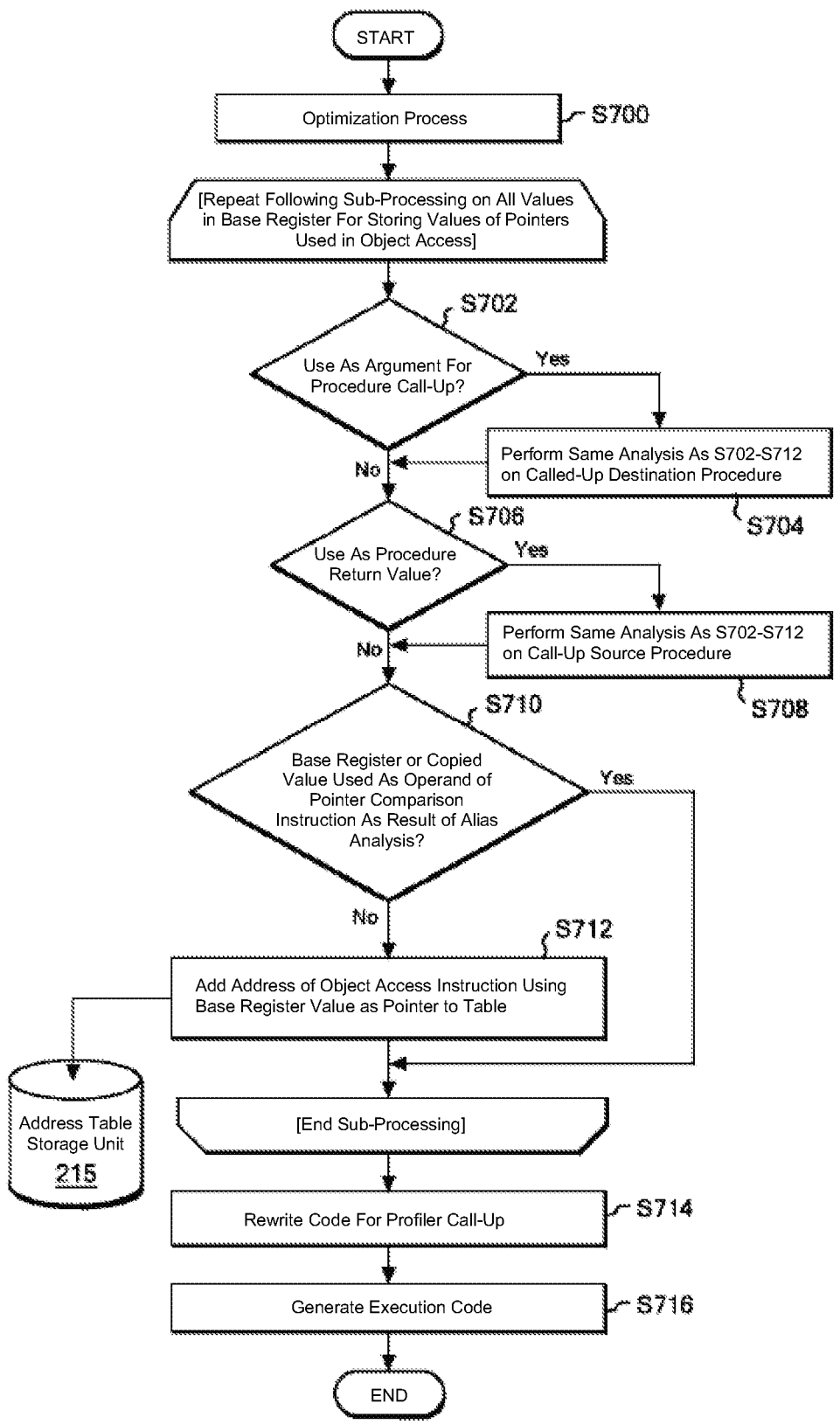
FIG. 7A shows an example of a detailed operational flow of the dynamic profiler 125 in Step 424 shown in FIG. 4.
Figure 7B:
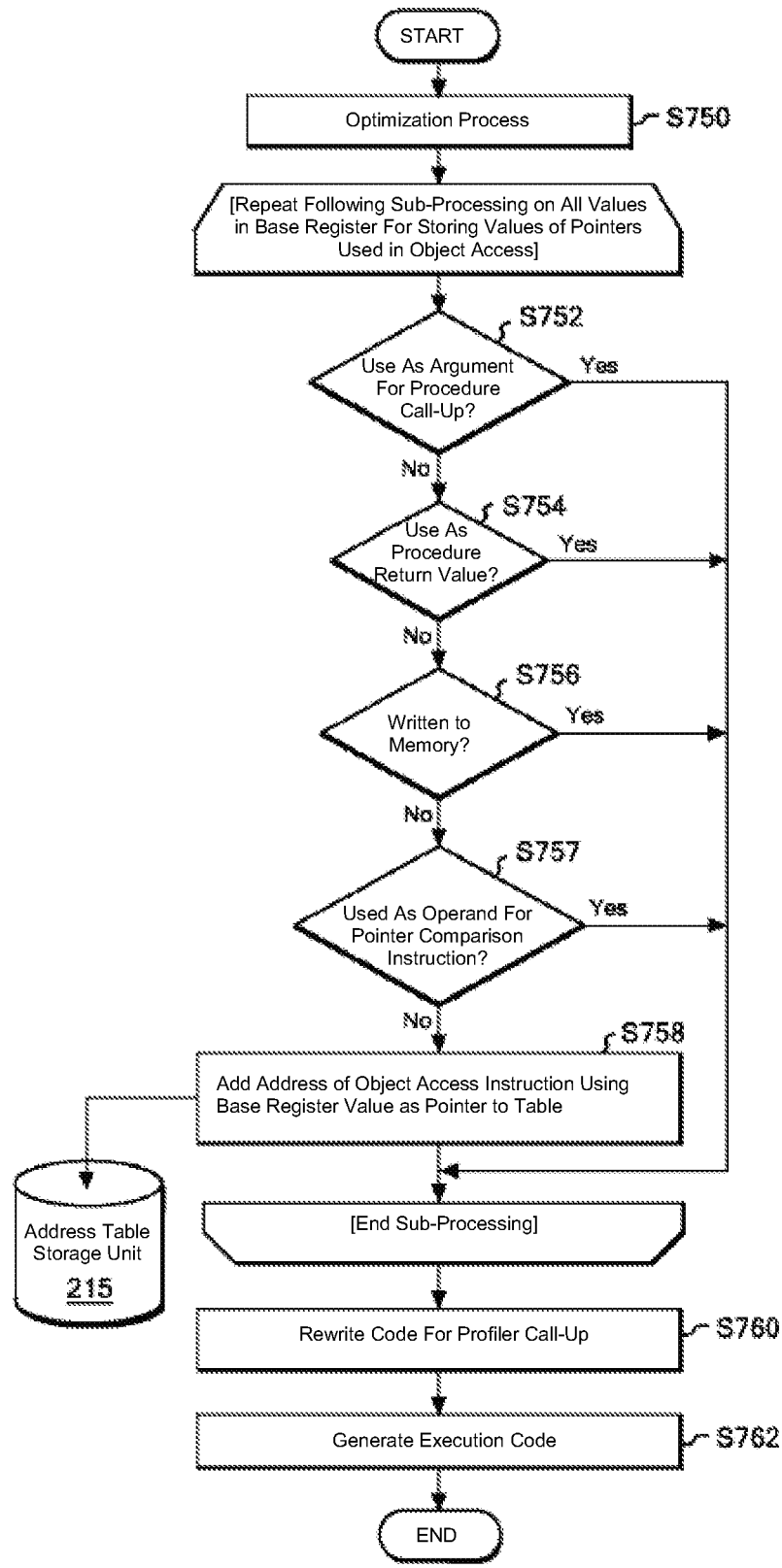
FIG. 7B shows another example of a detailed operational flow of the processing performed by the dynamic profiler 125 in Step 424 shown in FIG. 4.

The following is an explanation of the operation of the profile target determining device 200 with reference to FIG. 4 through FIG. 7A and FIG. 7B. FIG. 4 shows an example of an operational flow of the profile target determining device 200 in an embodiment of the present invention. FIG. 5 shows an example of a detailed operational flow of the processing performed by the memory storage unit 130 in Step 410 shown in FIG. 4. FIG. 6 shows an example of a detailed operational flow of the processing performed by the profiler 120 in Step 420 shown in FIG. 4. FIG. 7A shows an example of a detailed operational flow of the dynamic profiler 125 in Step 424 shown in FIG. 4. FIG. 7B shows another example of a detailed operational flow of the processing performed by the dynamic profiler 125 in Step 424 shown in FIG. 4 (in a case in which inter-procedural analysis and alias analysis are not used).

The operational flow of the profile target determining device 200 shown in FIG. 4 starts at Step 400 in which the executing unit 115 initializes the sampling frequency for each class or object allocation site using the same predetermined value. Next, the executing unit 115 calls up the memory storage unit 130, and sets the page protecting mechanism to call up the profiler 120 (Step 402). Next, the executing unit 115 starts executing the execution target program (intermediate code) and reads the instruction to be executed next.

Next, the executing unit 115 determines whether or not the current instruction to be executed allocates an object (Step 406). When it has been determined that the current instruction allocates an object (Step 406: YES), the executing unit 115 determines whether or not garbage collection is necessary (Step 408). When it has been determined that garbage collection is necessary (Step 408: YES), the executing unit 115 calls up the memory storage unit 130 and executes the process. Details of the process performed by the memory storage unit 130 will be described below with reference to FIG. 5.

After the process performed by the memory storage unit 130 has been completed, the executing unit 115 determines whether or not the object allocated by the current instruction is to be sampled on the basis of the sampling frequency of the class or object allocation site stored in the sampling frequency storage unit 240. In other words, it determines whether or not the object is a profile target (Steps 412, 414). When it has been determined that the object is a profile target (Step 414: YES), the executing unit 115 sets the mark indicating a sampling target in the pointer to the allocated object (Step 416), generates, initializes and stores profile information with a predetermined data structure corresponding to the allocated object in the profile information storage unit 225 (Step 417). The profile information with the predetermined data structure is a profile information structure for each object as described above. In this situation, it is a profile information structure for each corresponding class and a profile information structure for the allocation site. The latter profile information structure is generated only in this situation. However, it should be noted that a profile information structure for each corresponding object is always generated during initialization in a process in which the number of bytes of an allocated object is added to the first and second fields of the profile information structure for each corresponding class and the profile information structure for each allocation site.

After Step 417, the process advances to Step 418 when it has been determined in Step 406 that the current instruction does not allocate an object (Step 406: NO) or when it has been determined in Step 414 that the object is not a profile target (Step 414: NO). Here, the executing unit 115 determines whether or not the current instruction is an access instruction to a sampled object (that is, a profile target object). When the current instruction is an access instruction to a profile target object (Step 418: YES), the execution unit calls up the profiler 120 and executes the process (Step 420). The process performed by the profiler 120 will be described in detail below with reference to FIG. 6.

After Step 420 or when it has been determined in Step 418 that the current instruction is not an access instruction to a profile target object (Step 418: NO), the process advances to Step 422 where the executing unit determines whether or not a portion of the intermediate code to be executed next requires dynamic compiling. When it has been determined that the intermediate code requires dynamic compiling (Step 422: YES), the executing unit calls up the dynamic compiler 125 and the process is executed (Step 424). The process performed by the dynamic compiler 125 will be described in detail below with reference to FIG. 7A and FIG. 7B.

After Step 424 or when it has been determined in Step 422 that dynamic compiling is not required (Step 422: NO), the process advances to Step 426 where the executing unit 115 determines whether or not execution of the execution target program has been completed. When execution of the execution target program has not been completed (Step 426: NO), the process returns to Step 404. When execution of the execution target program has been completed (Step 426: YES), the operational flow of the profile target determining device 200 is complete.

The operational flow performed by the memory managing unit 130 shown in FIG. 5 starts with Step 500 in which the memory managing unit 130 scans the tree structure indicating the relationship between objects referenced by pointer in order to detect all of the objects not yet used that have been generated in the heap area, and the following series of actions are repeated on all of the pointers indicating objects being used. First, the memory managing unit 130 determines whether or not a profile-unnecessary mark has been affixed to the object indicated by the current pointer (Step 502). When a profile-unnecessary mark has been affixed (Step 502: YES), the memory managing unit 130 removes the profile target mark from the current pointer (Step 504).

When a profile-unnecessary mark has not been affixed in Step 502 (Step 502: NO), the process advances from Step 504 to Step 506 where the memory managing unit 130 executes the usual garbage collection process on the current pointer. For example, the memory managing unit 130 affixes a mark in the mark storage area corresponding to the object indicated by the current pointer (the mark & sweep technique). The algorithm for the usual garbage collection process is well known in the art. Because this is not the subject of the present invention, a detailed description has been omitted.

When the series of actions mentioned above is performed on all of the pointers indicating objects to be used, the memory storage unit 130 discards the profile information structure of each unused object stored in the profile information storage unit 225. The process is then ended.

The operational flow performed by the profiler 120 shown in FIG. 6 starts with Step 600 in which the profiler 120 accesses the object in the current object access instruction that was the cause of the call up of the profiler 120. Next, the profiler 120 determines whether or not a profile-unnecessary mark has been affixed to the accessed object (Step 602).

When a profile-unnecessary mark has been affixed (Step 602: YES), the profiler 120 searches the address table stored in the address table storage unit 230 (Step 604), and determines whether or not an address has been recorded which matches the address in the current object access instruction (Step 606). When a matching address has been recorded (Step 606: YES), the profiler 120 accesses the base register storing the current pointer used in the current object access instruction, removes the profile target mark from the current pointer, and rewrites the pointer without a profile target mark to the base register (Step 608).

When a profile-unnecessary mark has not been affixed (Step 602: NO), the profiler 120 collects profile information on the object accessed by the current object access instruction, and updates the corresponding profile information stored in the profile information storage unit 225 (Step 610). Next, the profiler 120 determines whether or not access to the object according to the current object access instruction meets predetermined conditions for determining that the object satisfies the properties for optimization of the execution target program (Step 612). When it has been determined that the predetermined conditions have been met (Step 612: YES), the profiler 120 affixes a profile-unnecessary mark to the object accessed by the current object access instruction (Step 614).

The process advances from Step 614 to Step 616, and the profiler 120 calculates the sampling frequency for each class or object allocation site on the basis of the profile information stored in the profile information storage 225 and updates the information stored in the sampling frequency storage unit 240 with the calculated sampling frequency. The process ends after Step 616 or Step 608, or when no matching address has been registered in Step 606 (Step 606: NO), or when the predetermined conditions have not been met in Step 612 (Step 612: NO).

The operational flow of the process performed by the dynamic compiler 125, shown in FIG. 7A, starts with Step 700 in which the dynamic compiler 125 optimizes a portion of the code in the execution target program to be executed next. There are several types of optimization and the algorithms for these types of optimization are well known in the art. Because this is not the subject of the present invention, a detailed description has been omitted. Next, the dynamic compiler 125 detects all base registers storing pointers used in the object access instructions included in the portion of the code, and repeats the series of actions from Step 702 to Step 712 for each detected base register.

First, the dynamic compiler 125 determines whether or not the value in the current register is used as a procedure call-up argument for the corresponding object access instruction (Step 702). When it has been determined that the value is to be used as a procedure call-up argument (Step 702: YES), the dynamic compiler 125 performs the same actions as the series of analysis actions from Step 702 to Step 712 on the procedure of the call-up destination.

When it has been determined in Step 702 that the value is not used as a procedure call-up argument (Step 702: NO) or Step 704 has been completed, the process advances to Step 706 where the dynamic compiler 125 determines whether or not the value in the current base register is used as the procedure return value for the corresponding object access instruction. When it has been determined that the value is to be used as the procedure return value (Step 706: YES), the dynamic compiler 125 performs the same actions as the series of analysis actions from Step 702 to Step 712 on the procedure of the call-up source.

When it has been determined in Step 706 that the value is not used as a procedure return value (Step 706: NO) or the process in Step 708 has been completed, the process moves to Step 710 where the dynamic compiler 125 uses the results of the alias analysis to determine whether or not the value in the current base register or a value copied from the base register is used as an operand in a pointer comparison instruction. When it has been determined that the value is not used as an operand for a pointer comparison instruction (Step 710: NO), the dynamic compiler 125 registers the address of the object address instruction in which the value of the current base register is used as the pointer in the address table stored in the address table storage unit 215 (Step 712). When it has been determined in Step 710 that the value is used as an operand in a pointer comparison instruction (Step 710: YES), the series of actions performed on the current base register is ended.

When the series of actions from Step 702 to Step 712 has ended on all of the base registers, the dynamic compiler 125 rewrites the code for calling up the profiler 120 to a portion of the compiling target code (Step 714). Next, the dynamic compiler 125 compiles the portion of compiling target code, and generates native code (Step 716). The algorithm for the compiling process is well known in the art. Because this is not the subject of the present invention, a detailed description has been omitted. The process ends after Step 716.

Explanation of the operational flow of the processing shown in FIG. 7B performed by the dynamic compiler 125 in cases not involving inter-procedural analysis or alias analysis has been omitted because it does not differ from the operational flow shown in FIG. 7A except with regard to the following points.

Step 704 and Step 708 in the operational flow shown in FIG. 7A are not included.

In Step 757, which corresponds to the Step 710 in the operational flow shown in FIG. 7A, it is simply determined whether or not the value in the base register is used as an operation in a pointer comparison instruction without using an alias analysis.

If at least one of the Steps 752, 754 and 757 corresponding to Steps 702, 706 and 710 in the operational flow shown in FIG. 7A, and newly added Step 756, where it is determined whether a base register is written to memory, holds true, the possibility of the value of the base register being used in a pointer comparison instruction is considered true conservatively, and the series of actions performed on the current base register is ended immediately thereafter.

Experiment

1. Implementation

The profile target determining program in the embodiment of the present invention was implemented in a Java (registered trademark) virtual machine from IBM using a RISC processor with a maximum operating frequency of 4.7 GHz (Power 6 (trademark) with a quad-core, two-thread SMT engine) and a 32 GB main memory as hardware, and Linux (trademark) 2.6.18 as the operating system. The implemented profile target determining program is a program used to determine profile targets for three simultaneous optimizations on the basis of object immutability, write-only properties and inaccessibility. Six benchmark programs that allocate many objects were selected from SPECjvm2008 (compiler.compiler, derby, serial, Ssunflow, xml.transform, xml.validation).

2. Comparison

In this experiment, the following three sampling methods were performed.

1 MB/NoOpt (conventional method): one sampling per 1 MB of allocated objects (single, fixed sampling frequency).

64 MB/NoOpt (conventional method): one sampling per 64 MB of allocated objects (single, fixed sampling frequency; simple reduction in sampling frequency).

1 MB/Opt (present invention): A sampling frequency of one sampling per 1 MB of allocated objects is set as the initial value in a variable sampling frequency based on class/object allocation site.

3. Evaluation Criteria

In this experiment, there were two evaluation criteria: speed overhead and profiling accuracy. The baseline for the speed overhead were the conditions under which no access profiling is performed. The profiling accuracy was calculated as follows in an explanatory example of profiling performed to optimize on the basis of object immutability. First, the estimated percentage of the total number of bytes of immutable objects versus the total number of bytes of all allocated objects in each object allocation site was calculated on the basis of profile information. Then, all accesses of all objects were profiled separately to determine the true percentage in each allocation site. The absolute value of the difference between the estimated percentage and the true percentage (=error) was weight-averaged using the total number of bytes for all allocated objects in each allocation site. The other two optimizations were determined in the same manner.

4. Results

Figure 8:
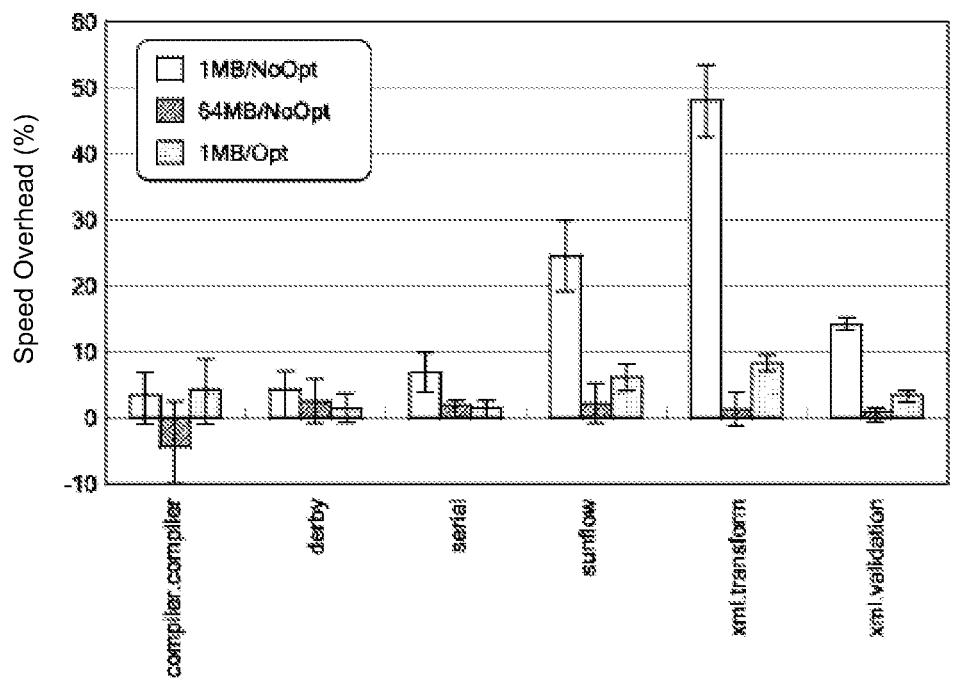
FIG. 8 shows the results of a comparison experiment regarding speed overhead in an embodiment of the present invention.
Figure 9A:
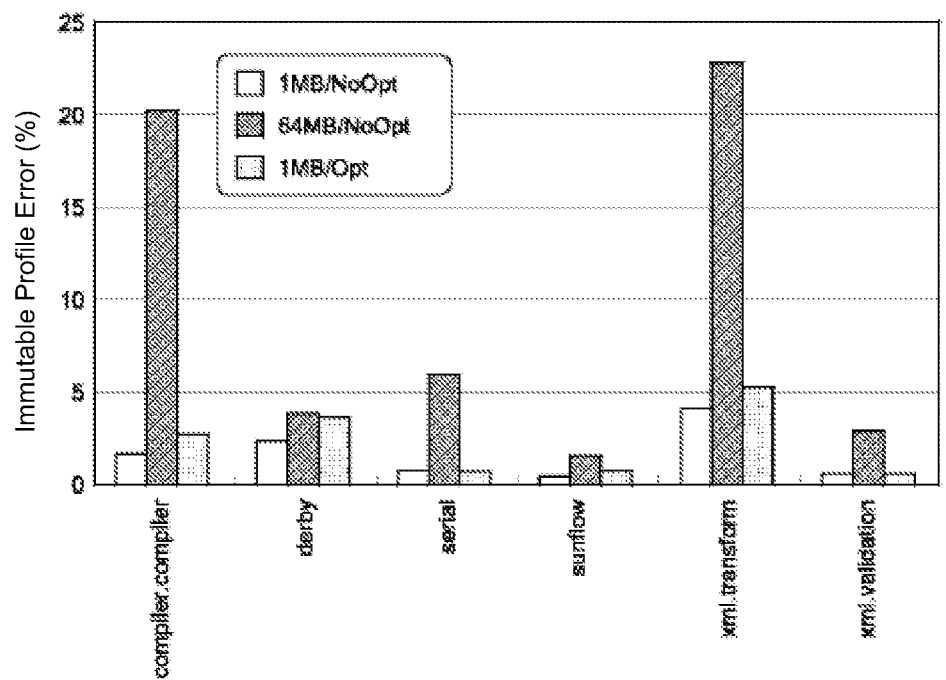
FIG. 9A shows the results of a comparison experiment regarding immutable profile errors in an embodiment of the present invention.
Figure 9B:
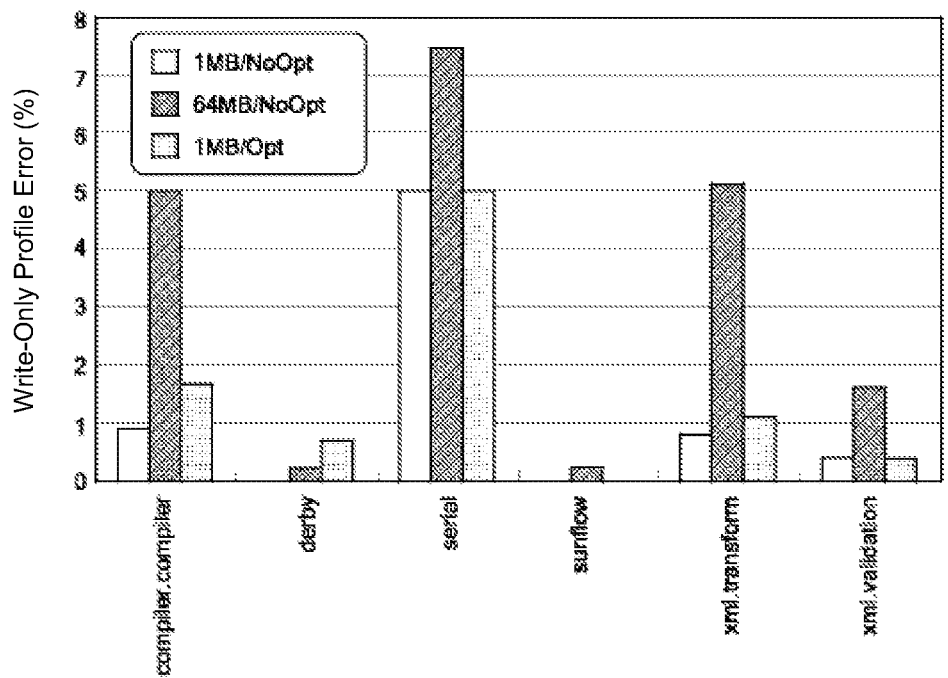
FIG. 9B shows the results of a comparison experiment regarding write-only profile errors in an embodiment of the present invention.
Figure 9C:
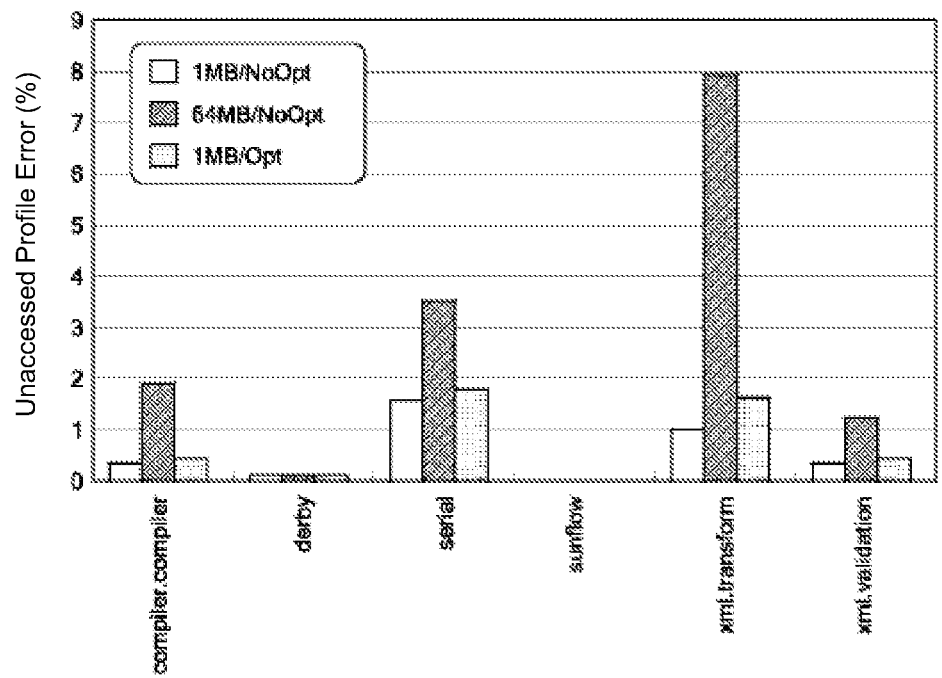
FIG. 9C shows the results of a comparison experiment regarding unaccessed profile errors in an embodiment of the present invention.

FIG. 8 shows the results of a comparison experiment regarding speed overhead. FIG. 9A through FIG. 9C show, respectively, the experiment results for profiling accuracy for profiling performed to optimize on the basis of object immutability, profiling accuracy for profiling performed to optimize on the basis of the write-only properties of objects, and profiling accuracy for profiling performed to optimize on the basis of the inaccessibility of objects. As shown in FIG. 8, the maximum speed overhead for 1 MB/NoOpt (conventional method) was at least 40%. As shown in FIG. 9A through FIG. 9C, the profiling errors in 64 MB/NoOpt (conventional method) were substantial. In the case of 1 MB/Opt (the present invention), the profiling accuracy for profiling performed to optimize on the basis of the inaccessibility of objects was the highest. Among the three types of optimization, it clearly had the greatest effect on optimization performed on the basis of the inaccessibility of objects.

The present invention was explained using an embodiment, but the technical scope of the present invention is not limited to the embodiment described above. The possibility of many changes and improvements to this embodiment should be apparent to those skilled in the art. Embodiments including these changes and improvements are within the technical scope of the present invention, as should be clear from the description of the claims.

The order of execution for operations, steps and action in the devices, systems, programs and methods described in the claims, description and drawings was described using such terms as "previous" and "prior". However, these operations, steps and actions can be realized in any order as long as the output of the previous process is used by the subsequent process. The operational flow in the claims, description and drawing were explained using terms such as "first" and "next" for the sake of convenience. However, the operational flow does not necessarily have to be executed in this order.

The invention claimed is:

1. A computer program product for determining a profile target for a sampling compiler, wherein the computer program product having a memory and processor, executes the steps of:
   storing access-related profile information in response to detecting access to an object that is set as a profile target on the basis of a sampling frequency for each class or object allocation site during execution of a program;
   calculating an object allocation percentage of the object having properties used in the optimization of the program at the each class or object allocation site on the basis of profile information; and
   reducing the sampling frequency regarding the class or the object allocation site in which the calculated percentage is below a predetermined threshold value.

2. The computer program product according to claim 1, wherein the object having properties used in the optimization of the program includes an immutable object not written after initialization.

3. The computer program product according to claim 1, wherein the object having properties used in the optimization of the program comprises a write-only object not read after initialization.

4. The computer program product according to claim 1, wherein the object having properties used in the optimization of the program comprises an unaccessed object having a field that is not accessed.

5. The computer program product according to claim 1, wherein the object set as a profile target is identified by a profile target mark affixed to the pointer indicating the object, and wherein the program in a computer executes the steps of:
   determining whether or not the object satisfies the properties used in the optimization of the program in response to detecting access to an object set as a profile target,
   affixing a profile unnecessary mark to the object on condition that the object does not satisfy the properties used in the optimization of the program, and
   removing the profile target mark affixed to the pointer indicating an object to which the profile unnecessary mark has been affixed during the garbage collection process initiated during execution of the program.

6. The computer program product according to claim 5, wherein it is determined that the object does not satisfy the properties used in the optimization of the program on condition that access to the detected object is access for writing after initialization of the object.

7. The computer program product according to claim 5, wherein it is determined that the object does not satisfy the properties used in the optimization of the program on condition that access to the detected object is access for reading the object.

8. The computer program product according to claim 5, wherein it is determined that the object does not satisfy the properties used in the optimization of the program on condition that access to the detected object is access to the final field of the object not having been previously accessed.

9. The computer program product according to claim 5, wherein the program in a computer executes the steps of:
   determining whether or not a profile-unnecessary mark has been affixed to the object in response to detecting access to the object set as a profile target,
   determining whether or not a value in a register storing the pointer indicating the accessed object is being used as an operand for a comparison instruction since access in response to a determination that a profile-unnecessary mark has been affixed, and
   removing and rewriting to the register the profile target mark affixed to the pointer indicating an object to which a profile-unnecessary mark has been affixed in response to a determination that the value has not been used as an operand for a comparison instruction.

10. The computer program product according to claim 9, wherein the program in a computer executes the step of:
   determining whether or not a value in a register storing the pointer indicating the object is being used as an operand for a comparison instruction since access for all access instructions to objects included in the program during the program optimization process, and recording an address of access instructions on condition that the value is not used as an operand for a comparison instruction, and wherein determining whether or not a value in a register storing the pointer indicating the accessed object is being used as an operand is performed by searching for the address of the access instruction for the access detected among the addresses recorded.

11. The computer program product according to claim 10, further comprising determining the use of the register value as an operand of a comparison instruction on condition that the register value is used as an argument for a procedure call-up, a procedure return value, an operand for a pointer comparison instruction, or a value written to memory.

12. A method for determining a profile target for a sampling compiler in an information processing device, wherein the method comprises:
   the information processing device storing access-related profile information in response to detecting access to an object that is set as a profile target on the basis of a sampling frequency for each class or object allocation site during the execution of a program;
   the information processing device calculating an allocation percentage of the object having properties used in the optimization of the program at each class or object allocation site on the basis of profile information; and
   the information processing device reducing the sampling frequency regarding a class or object allocation site in which the calculated percentage is below a predetermined threshold value.

13. An information processing system for determining a profile target for a sampling compiler, the information processing system comprising:
a memory;
a processor communicatively coupled to the memory; and
an information processing module communicatively coupled to the memory and the processor, wherein the information processing module is configured to execute the steps of:
storing access-related profile information in response to detecting access to an object that is set as a profile target on the basis of a sampling frequency for each class or object allocation site during the execution of a program;
calculating an allocation percentage of the object having properties used in the optimization of the program at each class or object allocation site on the basis of profile information; and
reducing the sampling frequency regarding a class or object allocation site in which the calculated percentage is below a predetermined threshold value.

* * * * *